(12) United States Patent
Tsukamoto et al.

(10) Patent No.: US 8,814,733 B2
(45) Date of Patent: Aug. 26, 2014

(54) BASEBALL OR SOFTBALL BAT WITH MODIFIED RESTITUTION CHARACTERISTICS

(75) Inventors: Michiharu Tsukamoto, Osaka (JP); Chui Mei Or, legal representative, Osaka (JP); Yohei Yamashita, Osaka (JP); Toshiaki Kida, Osaka (JP); Kazuhiko Shindome, Hashima (JP)

(73) Assignee: Mizuno USA, Inc., Norcross, GA (US)

( * ) Notice: Subject to any disclaimer, the term of this patent is extended or adjusted under 35 U.S.C. 154(b) by 246 days.

(21) Appl. No.: 13/345,553

(22) Filed: Jan. 6, 2012

(65) Prior Publication Data

US 2012/0178557 A1   Jul. 12, 2012

Related U.S. Application Data

(60) Provisional application No. 61/430,372, filed on Jan. 6, 2011.

(51) Int. Cl.
*A63B 59/06* (2006.01)

(52) U.S. Cl.
USPC .......................................... 473/566; 473/567

(58) Field of Classification Search
USPC .................... 473/457, 519, 520, 564–568
See application file for complete search history.

(56) References Cited

U.S. PATENT DOCUMENTS

| | | | |
|---|---|---|---|
| 3,801,098 A | | 4/1974 | Gildemeister |
| 4,272,971 A | | 6/1981 | Loyd et al. |
| 5,104,123 A | * | 4/1992 | Okitsu et al. ................. 473/520 |
| 5,364,095 A | * | 11/1994 | Easton et al. ................. 473/566 |
| 5,415,398 A | * | 5/1995 | Eggiman ....................... 473/566 |
| 5,511,777 A | | 4/1996 | McNeely |
| 5,676,610 A | | 10/1997 | Bhatt et al. |
| 5,899,823 A | * | 5/1999 | Eggiman ....................... 473/566 |
| 6,048,283 A | | 4/2000 | Albarelli, Jr. |
| 6,176,795 B1 | * | 1/2001 | Schullstrom ................. 473/566 |
| 6,398,675 B1 | * | 6/2002 | Eggiman et al. ............. 473/566 |

(Continued)

FOREIGN PATENT DOCUMENTS

JP      2002126144      5/2002

OTHER PUBLICATIONS

International Search Report and Written Opinion dated May 1, 2012 for related PCT Patent Application No. PCT/US2012/020537.

(Continued)

*Primary Examiner* — Mark Graham
(74) *Attorney, Agent, or Firm* — Troutman Sanders LLP; Robert R. Elliott, Jr.

(57) ABSTRACT

A softball or baseball bat with modified restitution characteristics is provided. The bat can comprise a substantially rigid shell coupled with a single or multi-piece insert. The shell can comprise a tip end, a barrel, a handle taper, and a handle. The insert can be press-fit or adhered to the inside of the barrel of the shell. The insert can be a single or multi-piece design and can be single or multi-layered. The insert can comprise a material capable of impact absorption. Portions of the insert can be separated from the shell with a separation layer to improve restitution in certain areas of the bat. The insert can also comprise multiple layers that are separated from each other with a separation layer to improve restitution in certain areas of the bat. The material and thickness of the insert and the shell can be varied to meet applicable restitution requirements.

10 Claims, 11 Drawing Sheets

(56) References Cited

U.S. PATENT DOCUMENTS

| | | | |
|---|---|---|---|
| 6,425,836 B1* | 7/2002 | Misono et al. | 473/567 |
| 6,432,007 B1 | 8/2002 | Filice et al. | |
| 6,482,114 B1* | 11/2002 | Eggiman et al. | 473/566 |
| 6,808,464 B1* | 10/2004 | Nguyen | 473/566 |
| 6,869,373 B1 | 3/2005 | Byrne et al. | |
| 6,872,156 B2 | 3/2005 | Ogawa et al. | |
| 6,949,038 B2* | 9/2005 | Fritzke | 473/566 |
| 6,997,826 B2 | 2/2006 | Sutherland | |
| 7,033,291 B1 | 4/2006 | Meeker | |
| 7,115,054 B2 | 10/2006 | Giannetti et al. | |
| 7,361,107 B2 | 4/2008 | Giannetti et al. | |
| 7,534,180 B1* | 5/2009 | Vacek et al. | 473/566 |
| 7,585,235 B2* | 9/2009 | Misono et al. | 473/567 |
| 7,749,115 B1 | 7/2010 | Cruz et al. | |
| 7,867,114 B2* | 1/2011 | Sutherland et al. | 473/567 |
| 2002/0091022 A1* | 7/2002 | Fritzke et al. | 473/566 |
| 2002/0094892 A1* | 7/2002 | Chauvin et al. | 473/566 |
| 2002/0151392 A1 | 10/2002 | Buiatti et al. | |
| 2003/0004020 A1 | 1/2003 | Ogawa et al. | |
| 2003/0153416 A1* | 8/2003 | Anderson | 473/566 |
| 2004/0053716 A1 | 3/2004 | Wu | |
| 2004/0176197 A1* | 9/2004 | Sutherland | 473/564 |
| 2005/0070384 A1* | 3/2005 | Fitzgerald et al. | 473/567 |
| 2007/0219027 A1 | 9/2007 | Chong | |
| 2008/0234075 A1 | 9/2008 | Lancisi | |
| 2009/0143176 A1 | 6/2009 | Burger | |
| 2009/0197712 A1* | 8/2009 | Giannetti et al. | 473/567 |
| 2009/0215560 A1 | 8/2009 | McNamee et al. | |
| 2009/0280934 A1 | 11/2009 | Watari et al. | |
| 2009/0280935 A1 | 11/2009 | Watari et al. | |
| 2011/0195808 A1 | 8/2011 | Chauvin | |
| 2011/0281674 A1 | 11/2011 | Shindome et al. | |
| 2012/0046137 A1* | 2/2012 | Smith | 473/566 |
| 2012/0178558 A1 | 7/2012 | Tsukamoto et al. | |

OTHER PUBLICATIONS

Final Office Action for U.S. Appl. No. 12/796,915 dated Apr. 5, 2012.
International Search Report and Written Opinion dated Apr. 25, 2012 for related PCT Patent Application No. PCT/US2012/020540.

* cited by examiner

BASEBALL OR SOFTBALL BAT WITH MODIFIED RESTITUTION CHARACTERISTICS

CROSS-REFERENCE TO RELATED APPLICATIONS

This application claims the benefit of U.S. Provisional Application Ser. No. 61/430,372, filed 6 Jan. 2011, which is incorporated herein by reference in its entirety as if fully set forth below.

BACKGROUND OF THE INVENTION

1. Field of the Invention

The present invention relates generally to hybrid bats for use in baseball and softball and specifically to bats with modified restitution characteristics to meet performance standards imposed by various sanctioning bodies.

2. Background of Related Art

Conventionally, bat manufacturers have endeavored to improve the performance of bats. In the case of a bat, improved performance can come in the form of, among other things, improved accuracy, reduced vibration, or increased coefficient of restitution. The latter, coefficient of restitution, relates to the power the bat imparts to the ball. In other words, the higher the coefficient of restitution of a bat, the faster the ball will rebound off the bat relative to the pitch speed.

Conventionally, bats were made out of hardwoods such as, for example, maple, birch, and ash. These woods provide good durability and reasonable cost of manufacture. In this case, however, the restitution characteristics of the bat are largely dictated (and limited) by the wood chosen. This limitation of the restitution, and thus power, of the bat, along with a certain amount of nostalgia, explains the use of wooden bats in Major League Baseball®. It is thought that the extreme amount of energy major league players could impart to the ball, if armed with the more powerful aluminum or composite bats, would pose a danger to themselves, other players, and fans.

Until recently, the increased power provided by non-wooden bats was not thought to be an issue at lower levels, such as collegiate baseball and softball. As a result, aluminum and composite bats were unregulated in NCAA sports until approximately 1998. As a result, the materials and designs were chosen to maximize the restitution of the bat. In other words, the bats were designed to increase the velocity of the ball as it left the bat, or to be "hotter."

An example of a bat design intended to maximize restitution is shown in U.S. Pat. No. 6,872,156 to Ogawa et al. This bat comprises an aluminum core with tapers at both ends of the barrel. The tapered portion is then wrapped with a thermal polyurethane (TPU) sheet to improve the restitution properties (i.e., the power) of the bat. Unfortunately, the double taper of this bat proves difficult to manufacture using conventional manufacturing techniques. In addition, the dual taper requires that the TPU sleeve be rolled onto the bat using hot forming techniques which produces a seam. As a result, it is difficult to maintain the density of the material during application and the seam presents a possible failure point that reduces durability.

After a marked increase in hitting statistics and player injuries, however, in 1998 the NCAA began looking into regulating the bats. Initially, the bats were regulated based on the return speed of a pitch at a set swing speed of the bat. This measurement was later found to be insufficient because, unlike solid wooden bats, the balance point of hollow non-wooden bats can be manipulated to increase swing speed. The closer the balance point of the bat is to the handle, for example, the faster a player can swing the bat, which is directly related to the ball speed coming off the bat.

Since 1998, continual refinement of the NCAA standard has resulted in a rule that governs many physical aspects of bats for use in NCAA sports. The size and weight of the bat is regulated, for example, along with the moment of inertia and the Baseball Coefficient of Restitution (BBCOR). Bats must be tested in NCAA laboratories for initial certification and may be subjected to random field-testing. The random field-testing ensures that certain bats, such as composite bats that tend to get "hotter" with use, remain within guidelines. Other domestic and foreign sanctioning bodies have, or are in the process of, imposing similar performance standards.

What is needed, therefore, is a bat designed, not to maximize absolute performance, but to maximize performance within a given set of guidelines. The bat should be tunable to meet different standards and inexpensive to manufacture. It is to such a bat that embodiments of the present invention are primarily directed.

SUMMARY OF THE INVENTION

Embodiments of the present invention relate to a hybrid baseball or softball bat with a substantially rigid shell comprising one or more inserts disposed inside the shell to tune the characteristics of the bat. In some embodiments, the shell can comprise a substantially rigid material, such as for example and not limitation, fiberglass, carbon fiber, and Kevlar. In a preferred embodiment, the shell can comprise aluminum. The shell can be, for example and not limitation, forged, blow-molded, hydroformed, or extruded.

The bat can further comprise a tuning insert pressed or adhered to the inside of the rigid shell. The insert can be shaped to maximize the size of the sweet spot, minimize swing weight, and/or control performance to meet performance requirements for various sanctioning bodies. In some embodiments, the tuning insert can comprise a single piece of material. In other embodiments, the tuning insert can comprise multiple pieces of material and/or a material with varying thickness. In some embodiments, the insert can be bonded or press-fit into an interior portion of the shell. In other embodiments, portions of the insert can be separated from the shell by a separation film to improve performance in certain areas. In some embodiments, the insert can be thin near the tip of the shell, thick in the "sweet spot" of the shell, and can thin as it approaches the handle portion of the shell. In some embodiments, the portion of the insert proximate the handle can be separated from the shell with a separation layer to provide double-walled construction.

Embodiments of the present invention can comprise a batting system for baseball or softball comprising a substantially rigid shell. The shell can comprise a tip portion, a barrel portion, a handle taper, and a handle portion. In some embodiments, the barrel portion and the handle portion can be substantially cylindrical in shape, and the handle taper can connect the barrel portion and the handle portion. The barrel portion can comprise a first zone, a second zone, and a third zone, with the first zone disposed closest to the tip portion, the third zone disposed closest to the handle taper, and the second zone disposed between the first zone and the third zone. The system can further comprise an insert, disposed inside the shell, sized and shaped such that substantially all of an outer surface of the insert can be affixed to the inside of the shell in one or more of the first zone, the second zone, and the third zone.

In some embodiments of the present invention, the insert can be adhered to the inside of the shell along substantially the entire length of the insert. In other embodiments, the insert can be separated from the shell by a separation film along substantially the entire length of the insert.

In some embodiments, a first portion of the insert can be adhered to the inner wall of the shell and a second portion of the insert can be separated from the shell by a separation film. The separation film can be, for example and not limitation, paper, Teflon, polyethylene, or polypropylene. The first portion of the insert can be located substantially within the first and second zones and the second portion of the insert can be located substantially within the third zone.

Some embodiments of the present invention also comprise a third portion of the insert that can be separated from the shell by a separation film. In these embodiments, the first portion of the insert can be located substantially within the first zone, the second portion of the insert can be located substantially within the second zone, and the third portion of the insert can be located substantially within the third zone.

In some embodiments, the insert can comprise at least two sections that are at least partially separated by a separation film. In some embodiments, the two sections can be separated substantially within the third zone, but not separated substantially within the first zone or the second zone. In other embodiments, the sections can be separated substantially within the third zone and substantially within the first zone, but not separated substantially within the second zone. In some embodiments, the separation film can be paper, Teflon, polyethylene, or polypropylene, for example and not limitation.

In some embodiments, the insert can have a thickness that varies along its length, and the insert can be thickest in the second zone. The insert can also be thicker at a location within the third zone than at any location within the first zone. In some embodiments, the insert can be between 0.10 and 2.5 mm thick within the first zone, between 1.0 and 5.0 mm thick within the second zone, and between 0.75 and 2.5 mm thick within the third zone.

In addition, in some embodiments, the insert can comprise, for example and not limitation, fiber reinforced plastic, thermal polyurethane, carbon fiber, nylon, or fiberglass.

Embodiments of the present invention can also comprise a bat for use in baseball or softball. The bat can comprise a substantially rigid shell comprising a tip portion, a barrel portion, a handle taper, and a handle portion. The handle taper can connect the barrel portion and the handle portion. There can also be an inner wall disposed inside the shell. In some embodiments, the barrel portion can comprise a first zone, a second zone, and a third zone, with the first zone disposed closest to the tip portion, the third zone disposed closest to the handle taper, and the second zone disposed between the first zone and the third zone. The present invention can also comprise a first insert disposed within at least the third zone. The first insert can comprise an outer surface, and substantially all of the outer surface of the first insert can be press-fit against at least a portion of the inner wall of the shell. In some embodiments, the present invention further comprises a second insert located substantially within the first zone of the barrel.

Embodiments of the present invention can also comprise a method for manufacturing a batting system. The method can comprise forming a substantially rigid shell. The shell can comprise a barrel portion, a handle taper, and a handle portion, and the barrel portion and the handle portion can be substantially cylindrical in shape. The handle taper can also connect the barrel portion and the handle portion. In some embodiments, the shell can further comprise an inner wall. In some embodiments, the method can further comprise placing an insert over an inflatable tube, introducing the inflatable tube into the shell, and inflating the inflatable tube such that at least a portion of the insert can substantially take the shape and dimensions of at least of a portion of the inner wall of the shell. The method can further comprise allowing the insert to harden inside the shell.

In some embodiments, a separation layer can be placed on at least a portion of the insert or at least a portion of the inner wall of the shell so that at least a portion of the insert does not directly contact the inner wall of the shell. In some embodiments, at least a portion of the insert can directly contact the inner wall of the shell. In some embodiments, a separation layer can be placed on at least a portion of the insert so that the separation layer at least partially prevents two sections of the insert from contacting each other.

Some embodiments of the present invention can also comprise placing an adhesive on at least a portion of the insert, at least a portion of the inner wall of the shell, or both, so that at least a portion of the insert can be adhered to the inner wall of the shell by the adhesive. In some embodiments, the adhesive can be an adhesive sheet, and the adhesive sheet can be between 0.10 and 0.12 mm thick.

In addition, in some embodiments, the inflatable tube can be shaped to vary the thickness of the insert along the length of the insert. In certain embodiments the insert can be wrapped around the inflatable tube. Moreover, in some embodiments, the insert can be heated to cause it to harden.

These and other objects, features and advantages of the present invention will become more apparent upon reading the following specification in conjunction with the accompanying drawing figures.

DETAILED DESCRIPTION OF THE INVENTION

Embodiments of the present invention relate to a hybrid baseball or softball bat, and more specifically a baseball or softball bat assembly comprising a substantially rigid shell with a tuning insert. In some embodiments, the shell can comprise a substantially rigid material such as, for example, fiberglass or carbon fiber. In a preferred embodiment, the shell can comprise aluminum. The shell can have a tip portion, a barrel portion, and a handle taper. In some embodiments, the handle taper can further comprise a knob.

The bat assembly can further comprise a sleeve, or insert. The sleeve can comprise, for example, thermoplastic polyurethane ("TPU"), polyurethane ("PU"), carbon fiber, nylon, or fiberglass. In a preferred embodiment, the sleeve can comprise fiber reinforced plastic (FRP). In some embodiments, the sleeve can be sized and shaped to be pressed or adhered to the inside of the barrel portion of the bat. The sleeve can comprise one or more elements and have one or more layers. The sleeve can have a variable thickness along its length to vary bat properties. The materials, dimensions, and thicknesses, among other factors, of the sleeve and the shell, can be manipulated to change the characteristics of the bat, such as the max BBCOR, the variation of the BBCOR along the barrel of the bat, and the weight distribution of the bat.

To simplify and clarify explanation, systems and methods are described below, generally, as an aluminum bat with a FRP insert and a method of making such a bat. One skilled in the art will recognize, however, that the invention is not so limited. The materials described hereinafter as making up the various elements of the present invention are intended to be illustrative and not restrictive. Many suitable materials that would perform the same or a similar function as the materials described herein are intended to be embraced within the scope of the invention. Such other materials not described herein can include, but are not limited to, materials that are developed after the time of the development of the invention. The methods described herein are also intended to be illustrative and not restrictive, as the scope of the invention covers several suitable methods and processes of manufacturing a bat.

Figure 1:
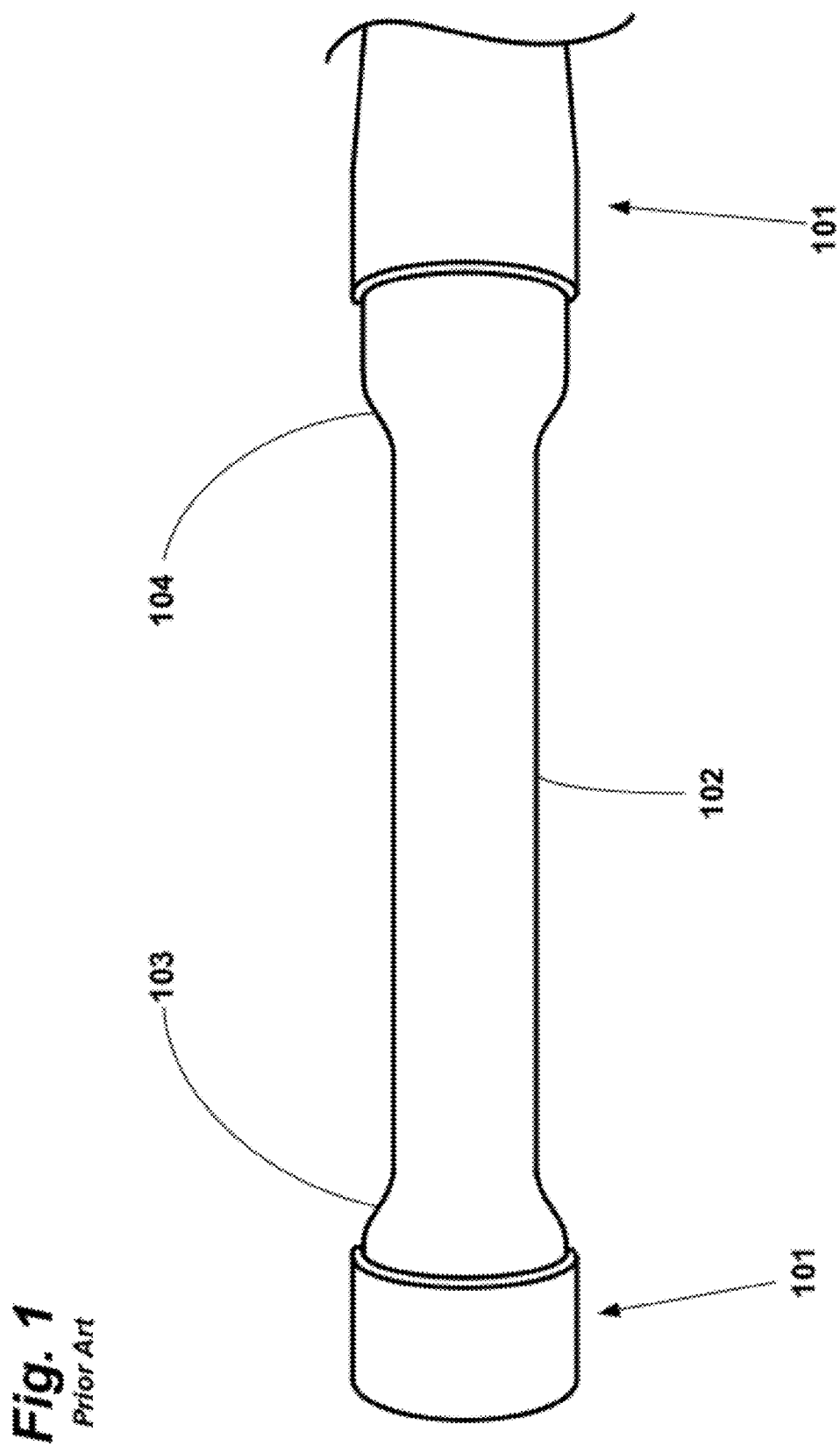
FIG. 1 depicts a prior art hybrid bat with dual flanges.

As described above, a problem with conventional hybrid bats is that they are difficult to manufacture. As shown in FIG. 1, conventional hybrid bats generally comprise a double barrel taper. A TPU sleeve 102 is then adhered to the bat 101 with an upper taper 103 and a lower taper 104. The double barrel taper unfortunately requires special forming processes that preclude the ability to use conventional metal forging, swaging, and/or extruding techniques. In addition, the double taper requires that the TPU sleeve 102 be seam welded or heat formed to the barrel, which can produce a seam in the sleeve 102. This is because the shape of the barrel prevents the sleeve from simply being pressed onto the barrel from one end or the other. In addition, previous bat designs have sought only to increase the power of the bat. The notion of creating ever "hotter" bats, however, is now at odds with rules imposed by a variety of sanctioning bodies.

Figure 2:
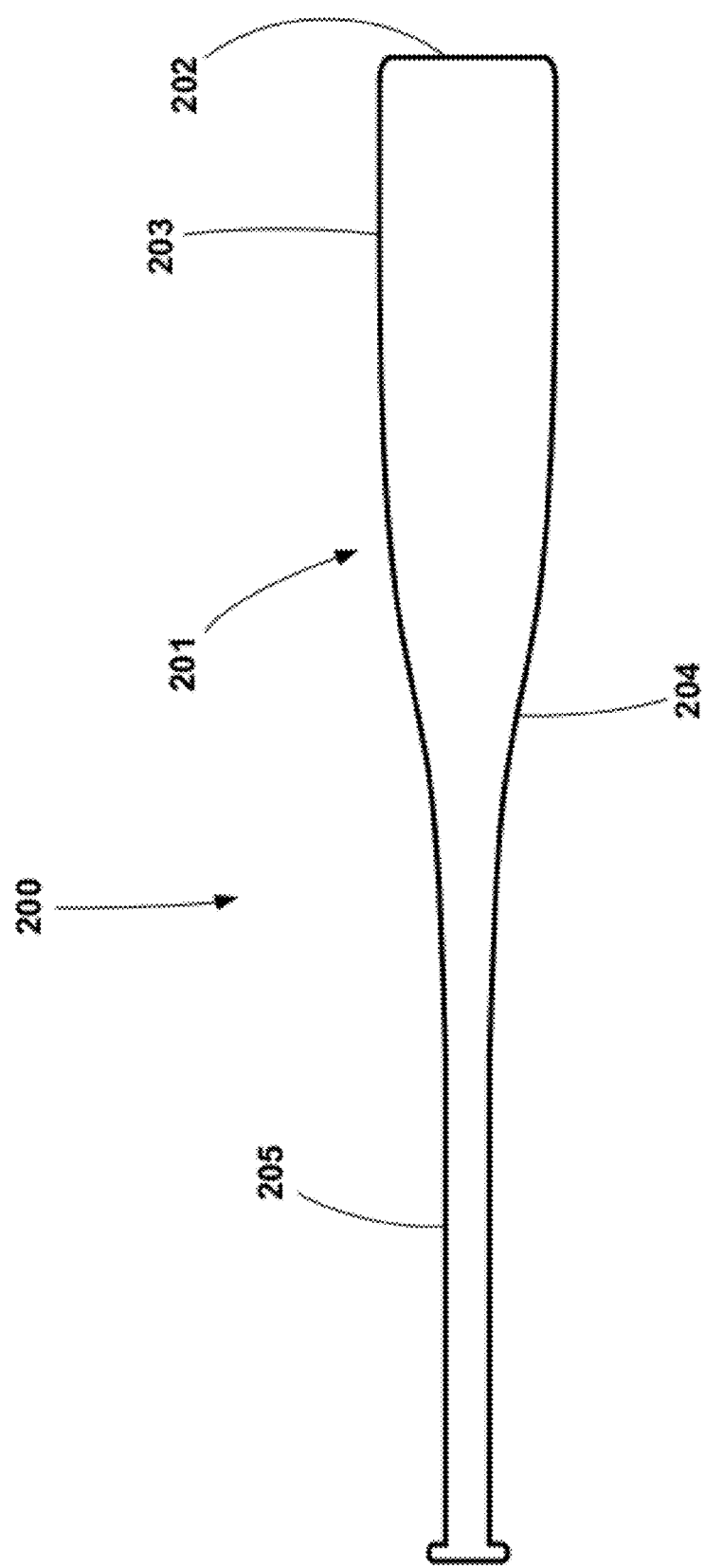
FIG. 2 depicts a bat in accordance with some embodiments of the present invention.

As shown in FIG. 2, embodiments of the present invention can comprise a batting system 200 with a substantially rigid shell 201. In a preferred embodiment, the shell can comprise aluminum, but other suitable materials such as, for example and not limitation, carbon fiber, Kevlar, and fiberglass could also be used. The shell 201 can be formed using many suitable methods, including but not limited to, forging, CNC machining, blow-molding, swaging, or extrusion. The shell 201 can comprise a tip portion 202, a barrel portion 203, a handle taper 204, and a handle 205. In some embodiments, the thickness of the shell 201 can be between approximately 1.0 and 5.0 mm. In exemplary embodiments, the thickness of the shell 201 can be between approximately 1.99 and 2.90 mm, and the thickness can vary along the length of the shell 201.

Figure 3:
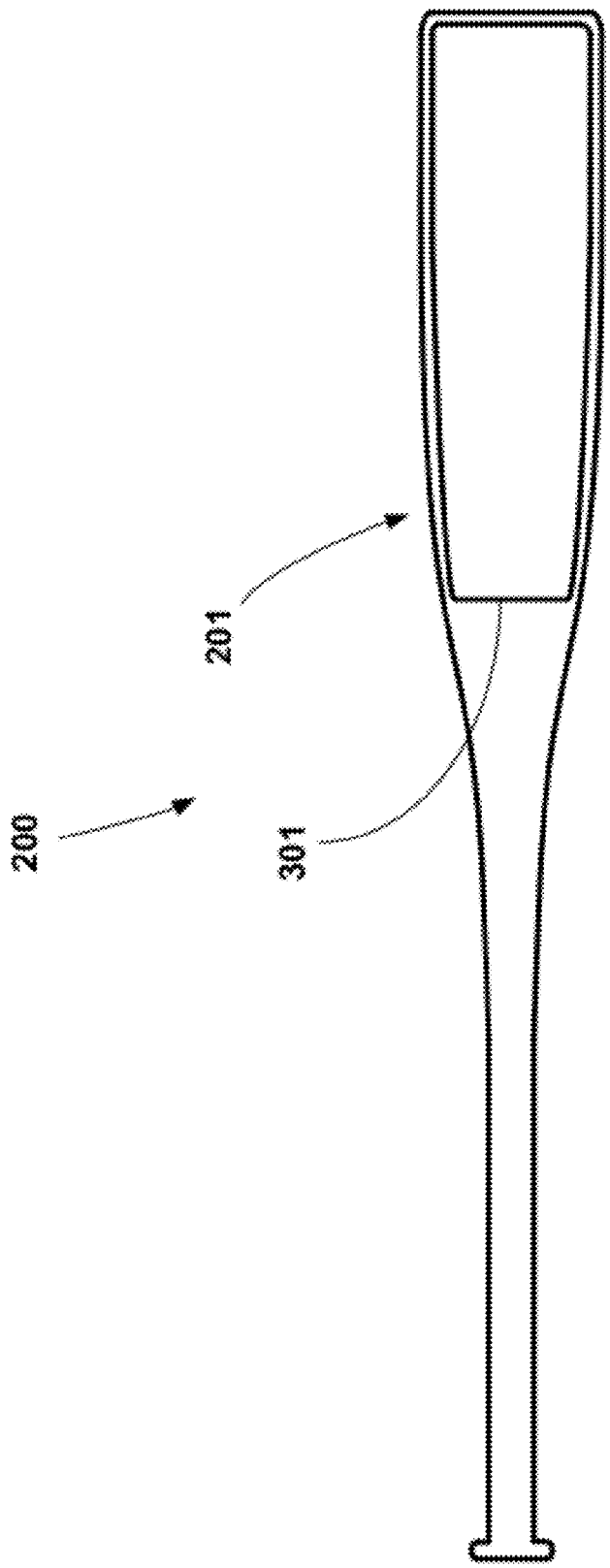
FIG. 3 depicts a cross-sectional view of a bat shell with a tuning insert, in accordance with some embodiments of the present invention.

FIG. 3 shows some embodiments of the bat of FIG. 2 with the front half of the bat cut away. As shown in FIG. 3, embodiments of the present invention can further comprise an insert 301. The insert 301 can be disposed inside the shell 201. The insert 301 can be configured to modify the characteristics of the bat to modify restitution, dampen vibration, and/or enlarge the hitting area (e.g., the "sweet spot"). In some embodiments, the insert 301 can be made from impact absorbing material. The insert 301 can comprise, for example and not limitation, fiber reinforced plastic, TPU, PU, carbon fiber, nylon, or fiberglass.

In some embodiments, the insert 301 can be, for example and not limitation, adhered or press-fit to the inside of the shell 201. In this configuration, the shell 201 and the insert 301 can act as a single wall or body. This can cause the shell 201 and the insert 301 to deform as one, which can dampen the bat and decrease the BBCOR (i.e., power) as compared to a single walled aluminum bat. This decreased BBCOR can advantageously prevent a bat from exceeding the limits imposed by various sanctioning bodies.

Figure 4:
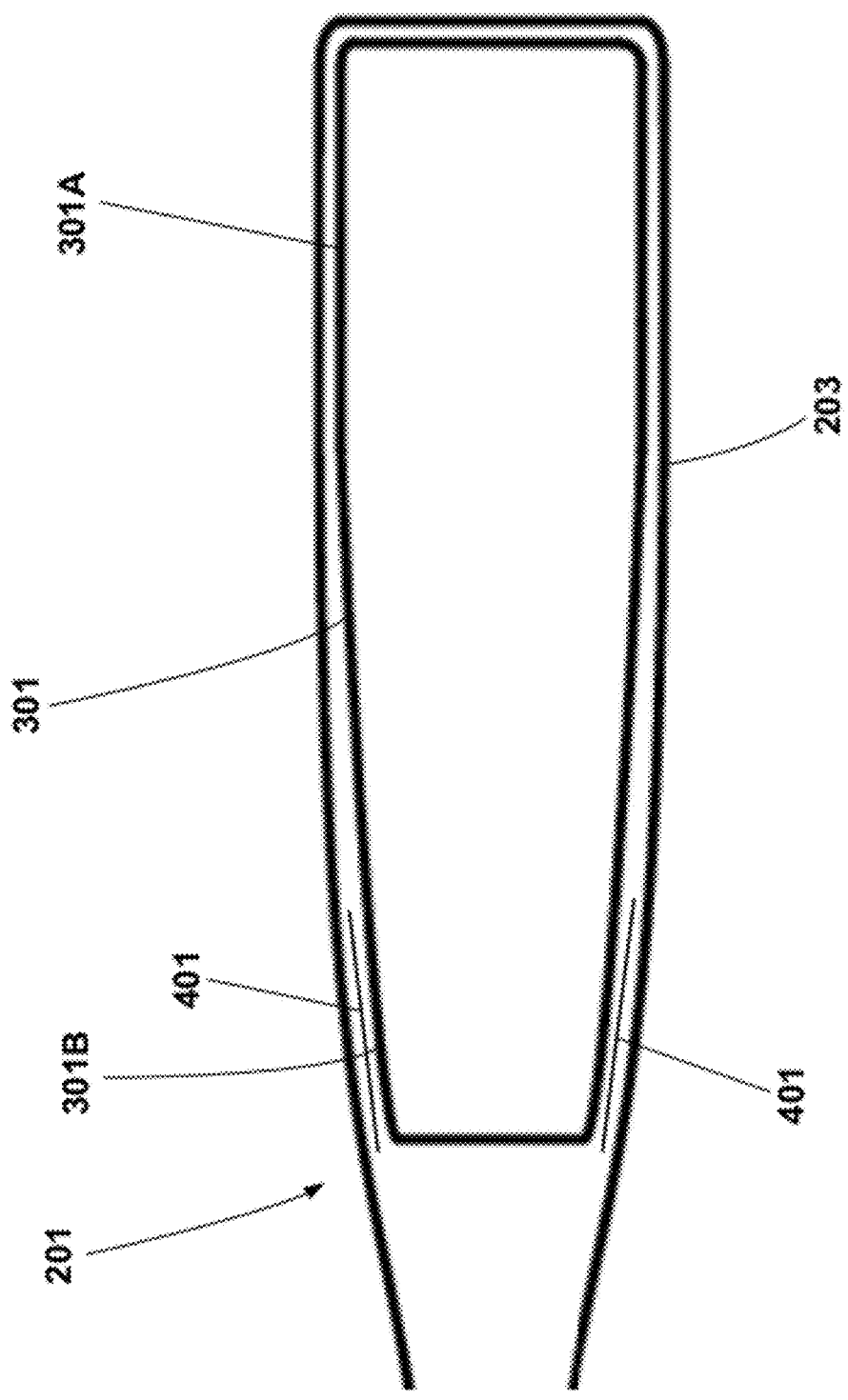
FIG. 4 depicts a cross-sectional view of a barrel of a bat with a tuning insert and a separation layer, in accordance with some embodiments of the present invention.
Figure 5:
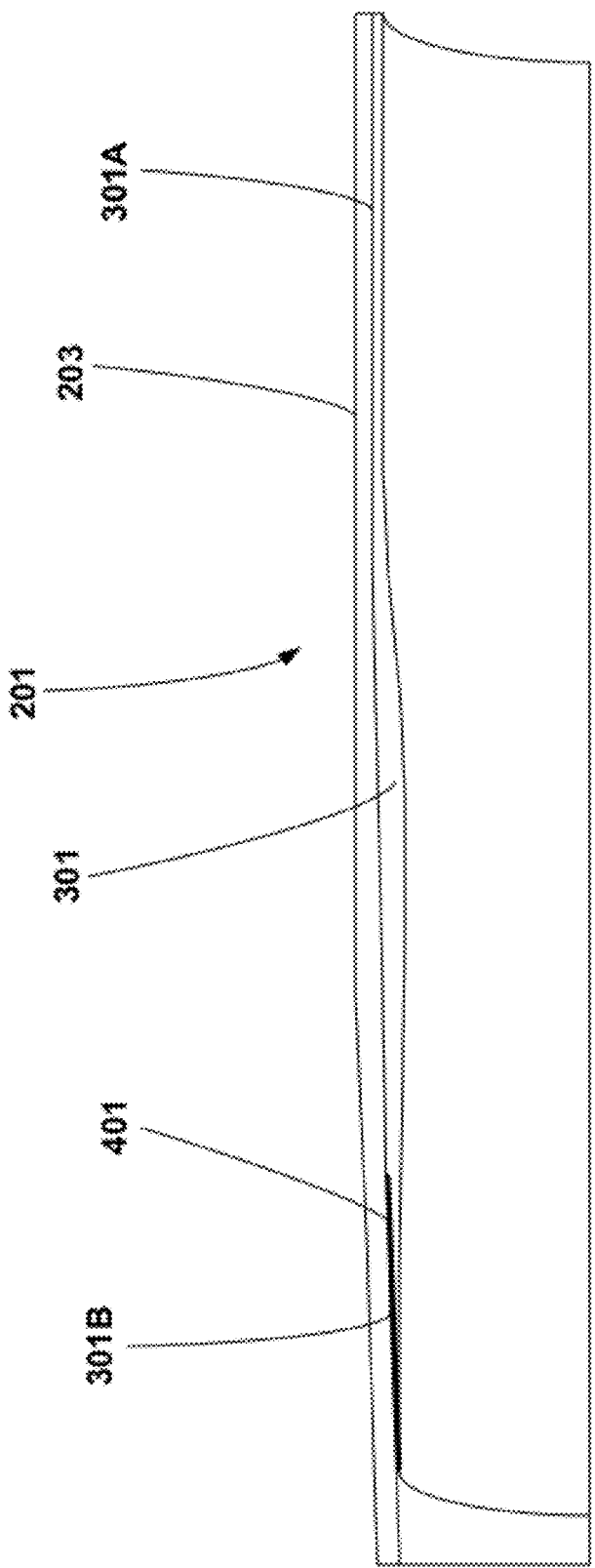
FIG. 5 depicts a close-up, cross-sectional view of the barrel of the bat from FIG. 4, in accordance with some embodiments of the present invention.

In some embodiments, as shown in FIGS. 4 and 5, a first portion 301A of the insert 301 can be adhered to the inside of the shell 201 while a second portion 301B of the insert 301 can be at least partially separated from the shell by a separation film 401. In the area of the separation film 401, therefore, the insert 301 and the shell 201 can act as a double-walled body. The double-walled configuration can allow the shell 201 and the insert 301 to move and/or deform independently of each other. The presence of the insert can cause the BBCOR in the area of the separation film 401 to be decreased, but by a smaller amount than in the areas where the shell 201 and the insert 301 act as a single wall or body (i.e., where there is no separation layer). Thus, when a separation film 401 is employed on different portions of the insert 301, a single insert 301 can reduce the BBCOR by different amounts in different locations along the barrel 203. The ability to control the dampening effect of the insert 301, therefore, can help a bat manufacturer control the BBCOR along the length of the barrel 203. In this manner, a bat manufacturer can tune the bat such that it has the maximum allowable BBCOR along the entire length of the barrel 203, despite the fact that parts of the barrel naturally have different BBCORs (e.g., the BBCOR of the handle 205 is inherently lower than in the "sweet spot" of the barrel 203).

Figure 6:
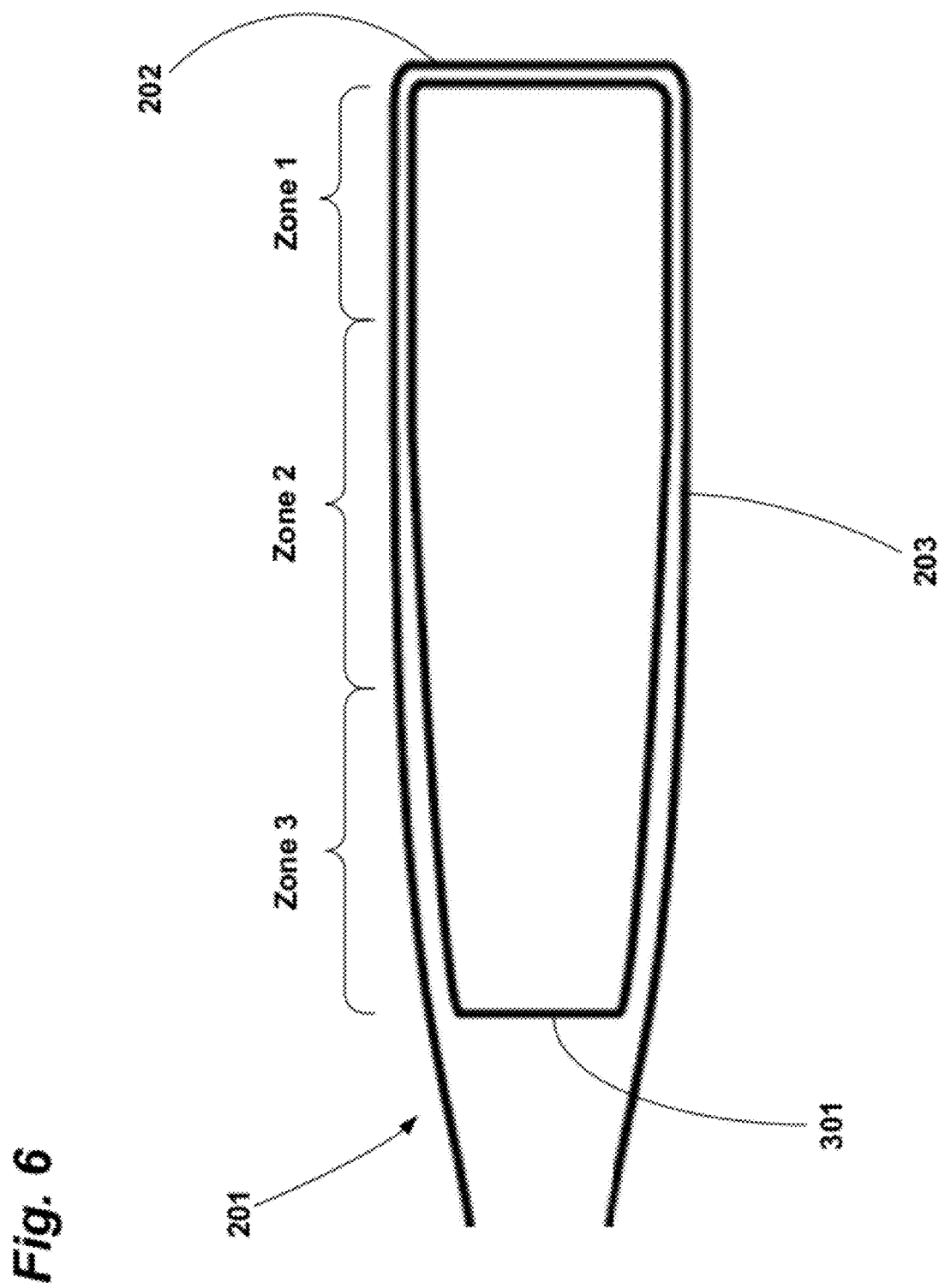
FIG. 6 depicts another cross-sectional view of a barrel of a bat with a tuning insert, in accordance with some embodiments of the present invention.

As shown in FIG. 6, in an exemplary embodiment, the barrel 203 of the bat can comprise three main zones. Zone 1 can comprise an area proximate the tip 202 of the bat, Zone 3 can comprise an area proximate the handle 205, and Zone 2 can be disposed therebetween. In a standard sized bat, for example, Zone 1 can extend from the tip 202 of the bat for approximately 6 inches. Of course, this configuration can vary based on different sized bats (e.g., little league vs. junior league vs. adult sizes) and even for different sports (e.g., softball vs. baseball).

In some embodiments, in Zone 1, the insert 301 can be relatively thin (e.g., between approximately 0.1 and 2.5 mm). In some embodiments, the portion of the insert 301 proximate Zone 1 can be adhered to the inside of the shell 201 using, for example and not limitation, standard epoxy, epoxy resin, or other liquid or solid adhesives. In a preferred embodiment, a fiber reinforced epoxy sheet between approximately 0.10 and 0.12 mm thick can be used.

Zone 2 can be disposed between Zone 1 and Zone 3 in the preferred hitting area of the bat, or the "sweet spot." In some embodiments, the insert 301 can be thicker in Zone 2 than in Zone 1. This can increase dampening and reduce the power of the bat, for example, to meet applicable rules or regulations. The increased dampening may also improve the feel of the bat when a batter hits a ball in the sweet spot. In some embodiments, the insert 301 can be, for example, between approximately 1.0 and 5.0 mm thick within Zone 2. The insert 301 can be adhered to the shell 201 in Zone 2, such that the insert 301 and the shell 201 act as a single wall that is slightly thicker than in Zone 1.

In some embodiments, the insert 301 can be slightly thicker in Zone 3 than in Zone 1, but slightly thinner than in Zone 2. In other embodiments, the insert 301 can be slightly thinner in Zone 3 than in Zone 1 and Zone 2. In Zone 3 the insert 301 can be, for example, between approximately 0.75 and 2.5 mm thick. In an exemplary embodiment, a separation layer 401 can be disposed between the insert 301 and the shell 201. See, FIG. 5. In this embodiment, the separation layer 401 can be disposed, for example, from approximately 165 mm to approximately 255 mm from the tip 202 of the shell 201. The separation layer 401 can comprise, for example and not limitation, paper, Teflon, polyethylene, or polypropylene. In this manner, the insert 301 and the shell 201 can act as a double-walled body. The independent motion between the insert 301 and the shell 201 can improve the restitution of the bat by increasing the rebound, or "trampoline" effect, of the bat. In this manner, while the restitution of the bat is reduced, it is reduced less than it would be without a separation layer 401. In this configuration, the power of hits near the handle 205, that would otherwise lack power (i.e., mishits), can be improved.

Example 1

The three zone configuration can provide a bat with:

(1) Zone 1—thin profile, e.g., approximately 2.09 to 4.49 mm overall, for improved swing speed due to light weight at the tip 202, (2) Zone 2—thick profile, e.g., approximately 2.99 to 7.90 mm, for an enlarged sweet spot coupled with reduced power to reduce mishits while staying within BBCOR regulations, and (3) Zone 3—tapered thickness, e.g., approximately 2.74 to 4.49 mm, to improve power for hits near the handle 205 (e.g., when the pitcher "jams" the batter).

As shown in FIG. 5, the thickness of the insert 301 can also be varied along the length of the barrel to provided desirable characteristics. In Zone 1, for example, the thickness of the insert 301 can be relatively thin to decrease weight near the tip and increase swing speed. In Zone 2, for example, which can be near the desired hitting area, or sweet spot, the thickness of the insert 301 can be increased to provide some energy absorption and decrease the power, or BBCOR, of the bat to meet applicable regulations. In addition, the insert may also improve feel and reduce vibration. In Zone 3, the insert 301 can be slightly thinner than in the sweet spot but thicker than near the tip 202. Alternatively, in Zone 3, the insert 301 can be slightly thinner than it is in both the sweet spot and near the tip 202. These configurations can enable the weight and durability of the bat to be controlled. In addition, BBCOR along the length of the bat can be controlled to improved hit consistency.

In addition to varying the thickness of the insert 301, the installation of the insert 301 can also be varied. In some embodiments, the entire insert 301 can be adhered or affixed to the inside of the shell 201 by, for example and not limitation, press-fitting and/or using a suitable adhesive, such that the insert 301 and the shell 201 substantially form a single wall. In other embodiments, portions of the insert 301 can be adhered to the shell 201, while other portions of the insert 301 can move independently of the shell 201. In a preferred embodiment, Zones 1 and 2 can be adhered to the shell 201 and Zone 3 can be separated from the shell 201 by a separation film 401 (shown in FIGS. 4 and 5). The separation film 401 can enable the insert 301 to move and deform independently of the shell 201 and can comprise, for example and not limitation, polyethylene film or Teflon. In a preferred embodiment, the separation film 401 can be paper.

Figure 7:
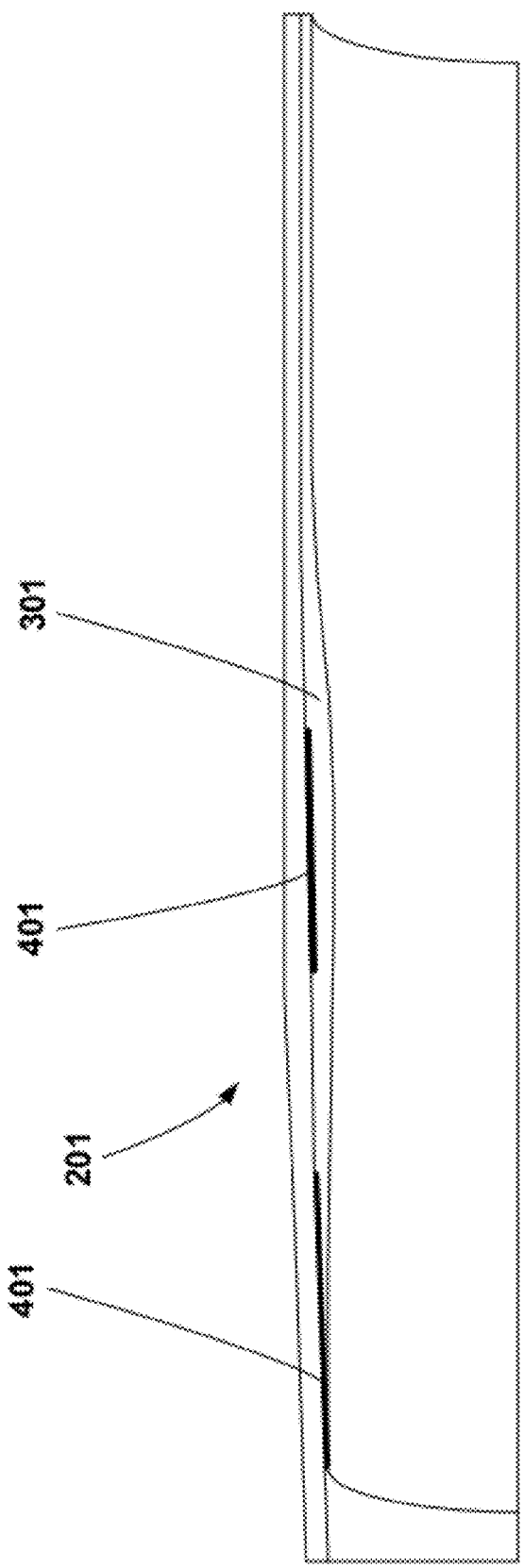
FIG. 7 depicts a close-up, cross-sectional view of the barrel of yet another bat with a tuning insert and multiple separation layers, in accordance with some embodiments of the present invention.

In another embodiment, shown in FIG. 7, the insert 301 can be adhered to the shell 201 in Zone 1 and separated from the shell 201 along all, or a portion of, Zones 2 and 3 by one or more separation films 401. In this embodiment, the insert 301 can be adhered to the shell, for example, proximate the junction of Zones 2 and 3. This configuration can enable the insert 301 and the shell 201 to deform independently at locations within both Zone 2 and Zone 3, which in turn allows the characteristics of the bat, including BBCOR, to be further controlled.

Figure 8:
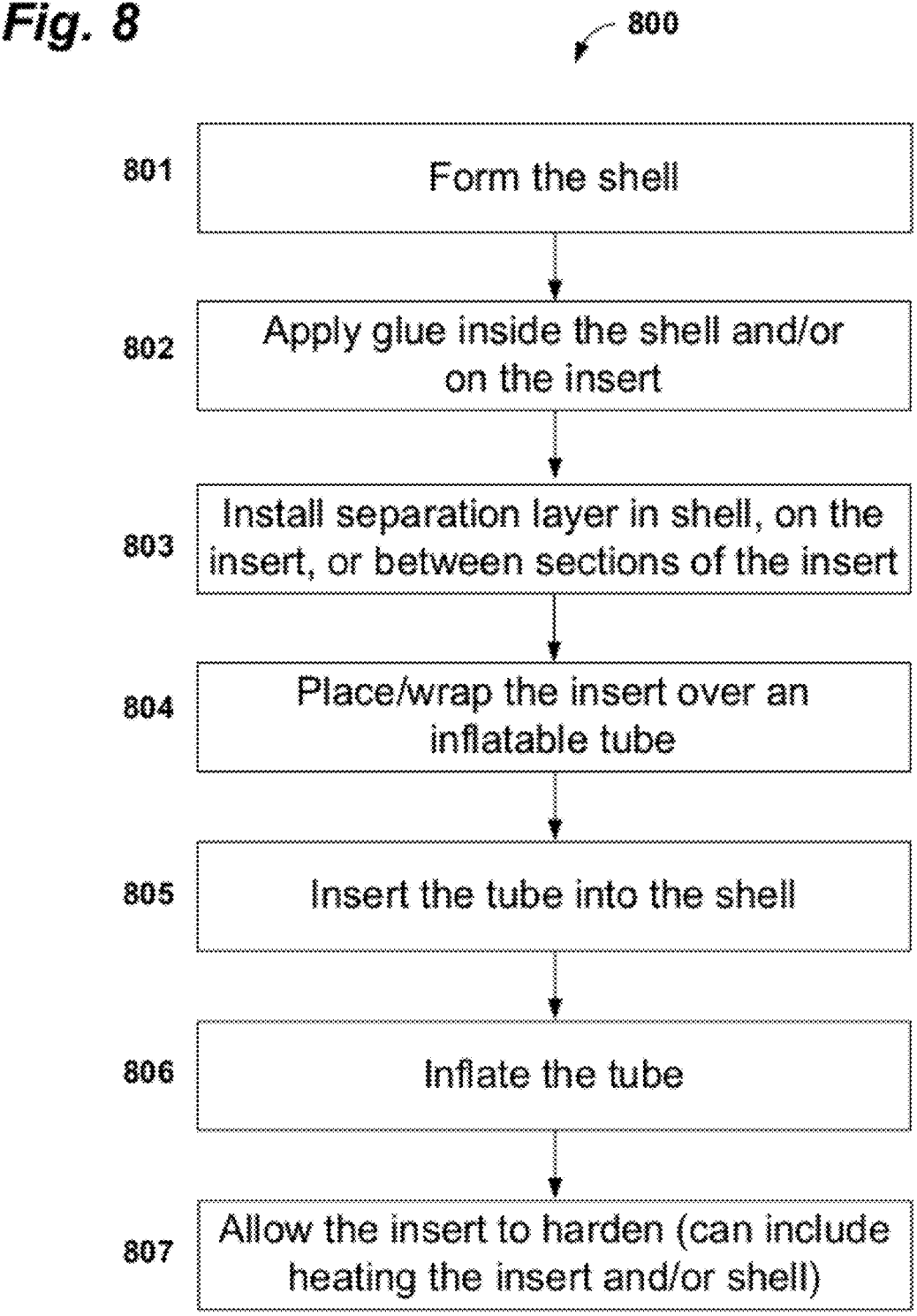
FIG. 8 is a flowchart depicting method of manufacturing a batting system, in accordance with some embodiments of the present invention.

As shown in FIG. 8, in some embodiments, the present invention can further comprise a method 800 for constructing a hybrid bat or batting system. The shell can be formed 801 using a suitable method, such as, for example and not limitation, forging, molding, swaging, or extrusion. Liquid glue or a glue sheet can be applied 802 inside the shell and can extend along a portion or substantially the entire length of the barrel. In some embodiments, the liquid glue or glue sheet can also be applied 802 to the insert prior to insertion. In a preferred embodiment, an epoxy glue sheet that is approximately 0.10 to 0.12 mm thick can be used.

In some embodiments, a separation layer can be installed 803 in the shell. The separation layer can be installed 803 near the handle taper and affixed to the lower portion of the liquid glue or glue sheet. In some embodiments, the separation layer can be installed 803 on the insert, between sections of the insert (discussed below), or inside the barrel. This can be accomplished, for example, by placing or wrapping the insert over an inflatable tube 804, inserting the tube into the shell 805, and inflating the tube so that the insert is expanded to conform to the shell 806. This can cause the insert to substantially take the shape and dimensions of the inside of the shell. The insert can then be allowed to harden 807. During the hardening process 807, depending on the type of insert used, it can be desirable to heat the insert and/or the shell to aid in forming the insert inside of the shell.

In some embodiments, the shape of the inflatable tube can vary. In other words, the shape of the inflatable tube can vary so that the thickness of the insert varies along its length when the insert is installed in the shell. For example, the inflatable tube can be shaped so that when the inflatable tube presses the insert against the shell, with the resulting insert thickest proximate Zone 2, and thinner in Zones 1 and 3. Of course, different configurations are contemplated with different inflatable tube profiles.

In some embodiments, a separation layer 401 can be installed in Zone 3 near the handle taper 204 and can be affixed proximate the lower portion of the glue sheet. The insert 301 can then be installed such that the portions of the insert 301 within Zones 1 and 2 are substantially affixed to the inner wall of the shell 201, while the portion of the insert within Zone 3 can be in contact with the inner wall of the shell 201 and/or in contact with a separation layer 401. The separation layer 401 can enable the insert 301 and the shell 201 to move independently. As described above, this can improve the restitution of the bat near the handle taper 204 and the handle 205. In other embodiments, multiple separation layers 401 can be installed in Zone 3. In still other embodiments, separation layers 401 can be installed in Zones 2 and/or 3. In yet other embodiments, multiple separation layers 401 can be installed in multiple zones.

Figure 9:
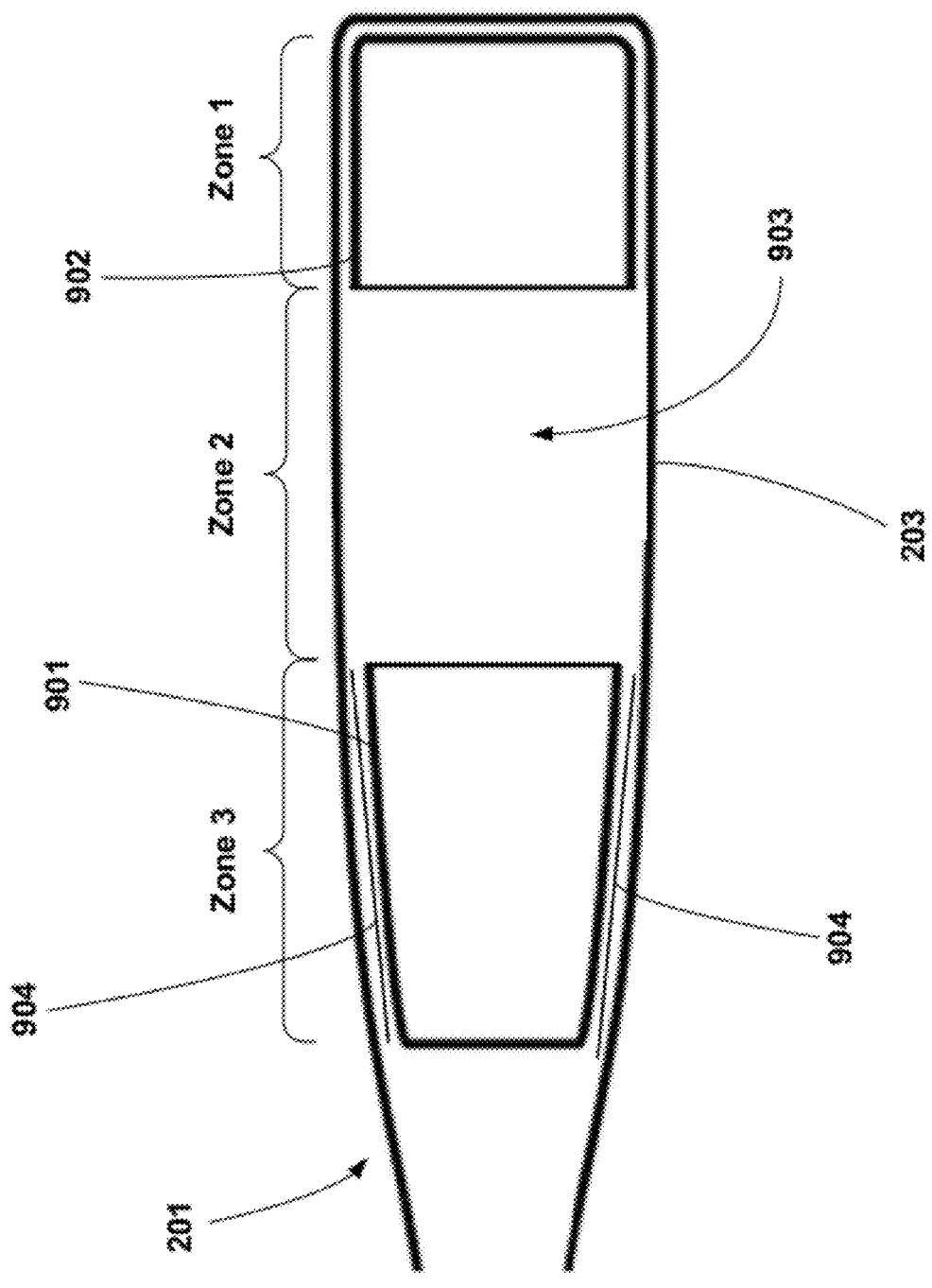
FIG. 9 depicts a cross-sectional view of a barrel of a bat with a plurality of tuning inserts, in accordance with some embodiments of the present invention.

As shown in FIG. 9, in some embodiments, the insert can comprise multiple pieces disposed within the shell 201. In an exemplary embodiment, a first insert 901 can be placed in Zone 3 and a second insert 902 can be placed in Zone 1. In this configuration, no insert is placed in Zone 2. The space 903 between the first insert 901 and second insert 902 (i.e., between Zone 1 and Zone 3) can be varied to increase or reduce restitution and/or vary the size and placement of the sweet spot. In some embodiments, the first insert 901 disposed in Zone 3 can be partially or completely separated from the shell 201 using a separation layer 904. As before, the first insert 901 and the separation layer 904 can be used to improve restitution and reduce the effects of mishits near the handle 205.

Figure 10:
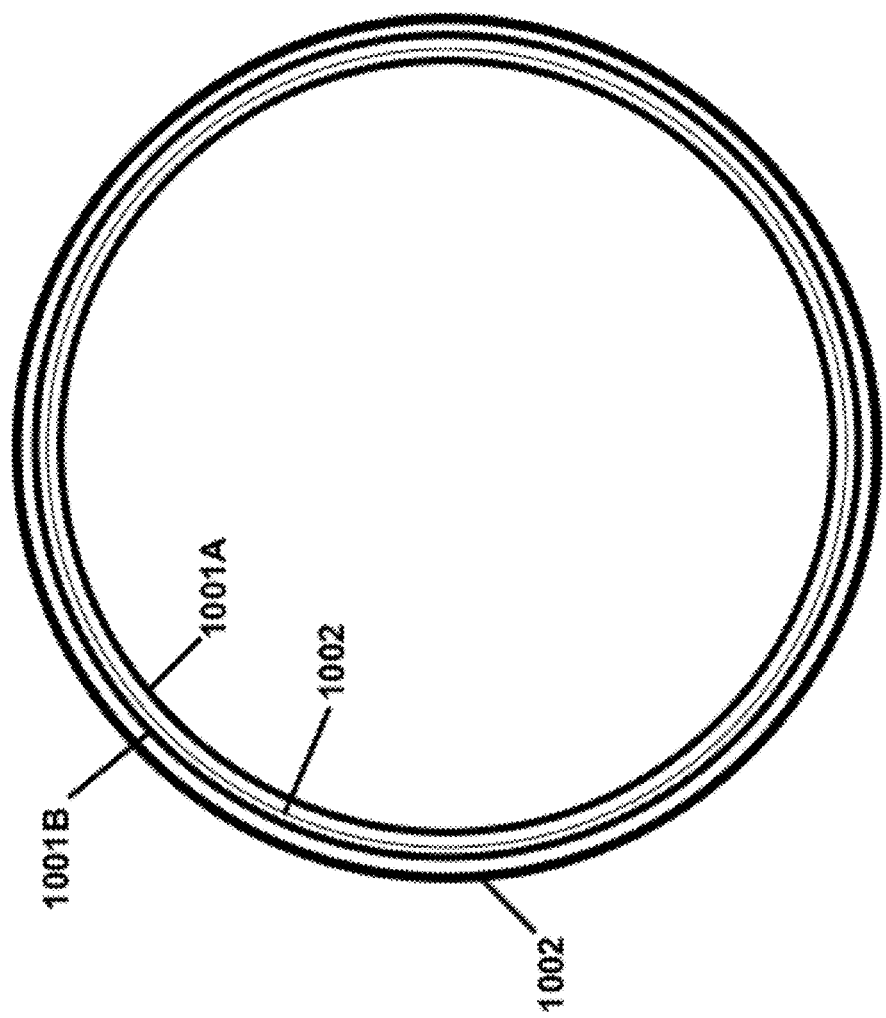
FIG. 10 depicts a cross-sectional view of a barrel of a bat with a multilayered tuning insert, in accordance with some embodiments of the present invention.

As shown in FIG. 10, which is a cross-sectional view of a bat, embodiments of the present invention can also comprise one or more inserts 1001 with two or more layers. The multi-layer inserts 1001 can comprise, for example and not limitation, an inner layer 1001A and an outer layer 1001B. In some embodiments, the two layers 1001A, 1001B of the insert 1001 can be at least partially separated by a separation layer 1002. In some embodiments, the multi-layer insert(s) 1001 and separation layers 1002 can be disposed in substantially the same locations along the barrel 203 as the inserts 301, 901, 902 described above, but between the layers 1001A, 1001B (as opposed to between the insert and the shell 201.

In a two-layer insert 1001, for example, the outer layer 1001B can be adhered to the shell 201 such that the outer layer 1001B and the shell 1003 can deform as a first body, and the inner layer 1001A can deform as a second body. As with the embodiments described above, the independent motion between the two bodies can improve the restitution of the bat by increasing the "trampoline" effect of the bat.

The method for constructing a hybrid batting system 800, describe above, can be modified to include installing the separation layer between layers of the multi-layer insert 803 before the tube is inserted into the shell 805. The multi-layer insert can then be placed over an inflatable tube 804, and the tube can then be inserted into the shell 805. The tube can subsequently be inflated so that the multi-layered insert can substantially assume the shape and dimensions of the inside of the shell 806. The multi-layered insert 1001 can then be allowed to harden 807.

In other embodiments, shell strength and thickness and insert materials, geometry, attachment, and placement can enable the bat to be tuned to meet varying regulations or player swing characteristics.

Figure 11:
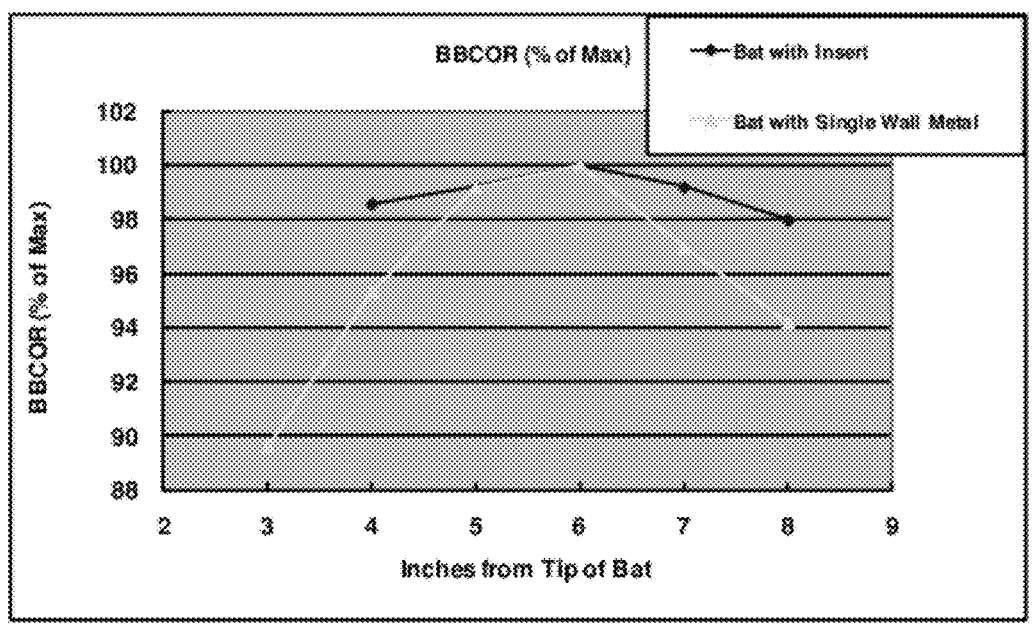
FIG. 11 depicts a chart of percent max BBCOR v. inches from the tip of the bat for a single wall metal bat and bat with an insert, in accordance with some embodiments of the present invention.

FIG. 11 depicts a graph demonstrating the ability of the bat and insert of the present invention to control BBCOR. Specifically, FIG. 11 shows the percentage of the Max BBCOR achieved at various locations on the barrel of a single metal wall bat vs. a bat with an insert 301. The relative flatness of the graph for the bat with insert compared to the single wall metal bat indicated the ability of the present invention to maintain a relatively constant BBCOR along the length of the barrel.

While several possible embodiments are disclosed above, embodiments of the present invention are not so limited. For instance, while several possible configurations have been disclosed (e.g., an aluminum bat with a single or multi-layered FRP insert), other suitable materials and configurations could be selected without departing from the spirit of embodiments of the invention. In addition, the location and configuration used for various features of embodiments of the present invention can be varied according to a particular bat size and weight, a particular set of rules, or simply user preference. Such changes are intended to be embraced within the scope of the invention.

The specific configurations, choice of materials, and the size and shape of various elements can be varied according to particular design specifications or constraints requiring a device, system, or method constructed according to the principles of the invention. For example, while certain exemplary ranges have been provided for thicknesses and locations, other configurations could be used for different sized bats or bats for different sports. Such changes are intended to be embraced within the scope of the invention. The presently disclosed embodiments, therefore, are considered in all respects to be illustrative and not restrictive. The scope of the invention is indicated by the appended claims, rather than the foregoing description, and all changes that come within the meaning and range of equivalents thereof are intended to be embraced therein.

The invention claimed is:

1. A batting system for baseball or softball, the batting system comprising:
    a substantially rigid shell comprising a tip portion, a barrel portion, a handle taper, and a handle portion, the barrel portion and the handle portion being substantially cylindrical in shape, the handle taper connecting the barrel portion and the handle portion; and
    an insert disposed within the shell;
    wherein the barrel portion comprises a first zone, a second zone, and a third zone, the first zone disposed proximate the tip portion, the third zone disposed proximate the handle taper, and the second zone disposed between the first zone and the third zone; and
    wherein the insert is sized and shaped such that substantially all of an outer surface of the insert is adhered to one or more of the first zone, the second zone, and the third zone;
    wherein the insert comprises two or more layers that are at least partially separated by a separation film proximate the third zone, but are not separated proximate the first zone or the second zone.

2. The batting system of claim 1, wherein the insert is adhered to the inside of the shell along substantially the entire length of the insert.

3. The batting system of claim 1, wherein the separation film is paper.

4. The batting system of claim 1, wherein the separation film is polypropylene.

5. The batting system of claim 1, wherein the insert has a thickness that varies along its length.

6. The batting system of claim 5, wherein the insert is thickest proximate the second zone.

7. The batting system of claim 6, wherein the insert is between approximately 0.10 and 2.5 mm thick proximate the first zone, between approximately 1.0 and 5.0 mm thick proximate the second zone, and between approximately 0.75 and 2.5 mm thick proximate the third zone.

8. The batting system of claim 1, wherein the insert comprises fiber reinforced plastic.

9. The batting system of claim 1, wherein the insert comprises thermoplastic polyurethane ("TPU").

10. A bat for use in baseball or softball, the bat comprising:
a substantially rigid shell comprising a tip portion, a barrel portion, a handle taper, and a handle portion, the handle taper connecting the barrel portion and the handle portion; and
a first insert disposed inside the barrel portion;
wherein the barrel portion comprises a first zone, a second zone, and a third zone, the first zone disposed closest to the tip portion, the third zone disposed closest to the handle taper, and the second zone disposed between the first zone and the third zone; and
wherein at least a portion of the first insert is disposed proximate the third zone; and
wherein the first insert is press-fit inside the barrel portion
wherein the insert comprises two or more layers that are at least partially separated by a separation film proximate the third zone, but are not separated proximate the first zone or the second zone.

\* \* \* \* \*